H. Disston,
Saw.

No. 112,227.          Patented Feb. 28, 1871.

Witnesses   A. H. Norris        H. Disston
                       By his Atty
                       H. Howson

United States Patent Office.

HENRY DISSTON, OF PHILADELPHIA, PENNSYLVANIA.

Letters Patent No. 112,227, dated February 28, 1871.

IMPROVEMENT IN SAWS.

The Schedule referred to in these Letters Patent and making part of the same.

*To all whom it may concern:*

Be it known that I, HENRY DISSTON, of Philadelphia, Pennsylvania, have invented an Improvement in Saws with Detachable Teeth; and I do hereby declare the following to be a full, clear, and exact description of the same, reference being had to the accompanying drawing and to the letters of reference marked thereon.

My invention consists of a recess formed in a saw-blade for the reception of a detachable tooth, in combination with holes so arranged in respect to the recess as to limit the extent of any fracture which may be caused in the blade by the introduction of the tooth into the said recess.

In order to enable others skilled the art to make and use my invention, I will now proceed to describe the manner of carrying it into effect, reference being had to the accompanying drawing which forms a part of this specification, and in which—

Figure 1:
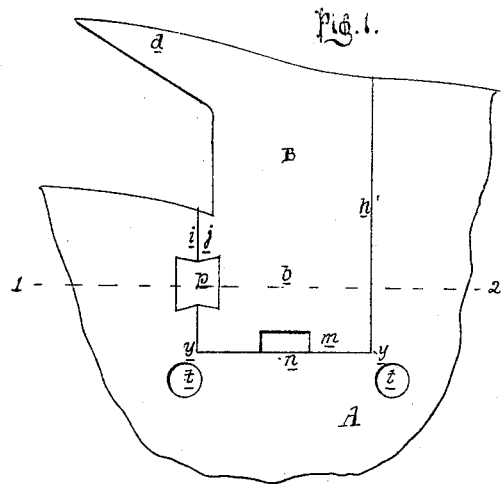
Figure 2:

Figure 1 is a side view of part of a saw-blade and a detachable tooth;

Figure 2, a section on the line 1 2, fig. 1; and

Figure 3:
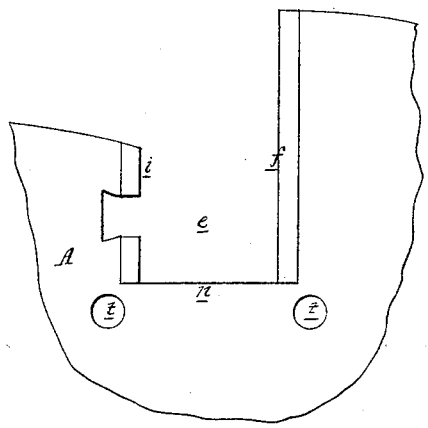

Figure 3, a view of part of the blade with the tooth removed.

Similar letters refer to similar parts throughout the several views.

A represents part of the blade, and

B the detachable tooth, the latter consisting of the rectangular portion $b$ and cutting portion $d$.

A recess, $e$, is cut in the blade for the reception of the body or rectangular portion of the tooth, the rear edge $f$ of the recess being formed into a V-shaped rib adapted to a similarly-shaped groove in the rear edge $h$ of the tooth, and the front edge $i$ of the recess being also V-shaped, and adapted to the front edge $j$ of the tooth, so that when the latter is fitted to its place it can have no lateral movement independently of the blade.

The bottom $n$ of the recess $e$ may be plain, so as to form a rest for the plain lower edge of the tooth.

In order to retain the tooth within the recess I use a small plate, $p$, part of which is dovetailed into the blade and part into the tooth, as seen in fig. 1, the plate being driven tightly to its place and lightly riveted, if necessary, for security.

In saws with detachable teeth the strain imparted to the blade by the introduction of the teeth, and subsequent pressure against the saw, is apt to crack and distort the blade.

In the present instance a break might take place at the corners $y$ $y$, which would impair the saw to such an extent as to render it useless but for the holes $t$ $t$ which are bored through the blade in the line of the probable fractures, and which restrict the latter to such a limit that they can have but little tendency to affect the integrity of the saw.

Without confining myself to the precise form of the tooth described,

I claim as my invention and desire to secure by Letters Patent—

The recess $e$ in the blade, for the reception of a detachable tooth, in combination with holes $t$ $t$ bored in the blade, and arranged in respect to the corners of the said recess, substantially as and for the purpose herein set forth.

In testimony whereof I have signed my name to this specification in the presence of two subscribing witnesses.

HENRY DISSTON.

Witnesses:
WM. HALL WAXLER,
CHARLES E. FOSTER.